(12) United States Patent
Yu et al.

(10) Patent No.: US 10,405,220 B2
(45) Date of Patent: Sep. 3, 2019

(54) FLEXIBLE PRINTED CIRCUIT BOARD, MOBILE TERMINAL AND FAULT DETECTION METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chao Yu, Beijing (CN); Rui Liu, Beijing (CN); Junjie Xu, Beijing (CN); Bing Xia, Beijing (CN); Yanming Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/025,080

(22) Filed: Jul. 2, 2018

(65) Prior Publication Data
US 2019/0053079 A1 Feb. 14, 2019

(30) Foreign Application Priority Data

Aug. 10, 2017 (CN) .......................... 2017 1 0681679

(51) Int. Cl.
| | | |
|---|---|---|
| *H04B 7/00* | (2006.01) | |
| *H04W 24/08* | (2009.01) | |
| *H01Q 1/24* | (2006.01) | |
| *H04M 1/02* | (2006.01) | |
| *H04M 1/725* | (2006.01) | |

(Continued)

(52) U.S. Cl.
CPC ............ *H04W 24/08* (2013.01); *H01Q 1/243* (2013.01); *H01Q 9/42* (2013.01); *H04M 1/0266* (2013.01); *H04M 1/0277* (2013.01); *H04M 1/7253* (2013.01); *H04W 8/005* (2013.01); *H01Q 1/2291* (2013.01); *H01Q 1/38* (2013.01)

(58) Field of Classification Search
CPC ..... H04W 24/08; H01Q 1/243; H01Q 1/2291; H01M 1/0266; H01M 1/0277; H01M 1/7253
USPC .................................. 455/41.1, 41.2
See application file for complete search history.

(56) References Cited

U.S. PATENT DOCUMENTS

| | | | |
|---|---|---|---|
| 2009/0256758 A1 | 10/2009 | Schlub et al. | |
| 2011/0051382 A1* | 3/2011 | Yumoto | G02F 1/13452 361/749 |

(Continued)

FOREIGN PATENT DOCUMENTS

| | | |
|---|---|---|
| CN | 1598649 A | 3/2005 |
| CN | 201340903 Y | 11/2009 |
| CN | 206020977 U | 3/2017 |

OTHER PUBLICATIONS

Chinese Office Action in Chinese Application No. 201710681679.9, dated Mar. 5, 2019 with English translation.

*Primary Examiner* — Sonny Trinh
(74) *Attorney, Agent, or Firm* — Collard & Roe, P.C.

(57) ABSTRACT

A flexible printed circuit board (FPC), a mobile terminal and a fault detection method thereof are disclosed. The FPC includes: a first surface and a second surface which are disposed opposite to each other, a backlight source is disposed on the first surface, and an antenna is disposed on the second surface.

11 Claims, 7 Drawing Sheets

(51) Int. Cl.
*H04W 8/00* (2009.01)
*H01Q 9/42* (2006.01)
*H01Q 1/22* (2006.01)
*H01Q 1/38* (2006.01)

(56) References Cited

U.S. PATENT DOCUMENTS

2014/0092034 A1* 4/2014 Franklin ............. G09F 13/0413
                                                        345/173
2017/0269421 A1* 9/2017 Oka .................. G02F 1/133305
2018/0090829 A1* 3/2018 McMichael ............ H01Q 1/362

* cited by examiner

FLEXIBLE PRINTED CIRCUIT BOARD, MOBILE TERMINAL AND FAULT DETECTION METHOD THEREOF

CROSS REFERENCE TO RELATED APPLICATION

The application claims priority to the Chinese patent application No. 201710681679.9, filed Aug. 10, 2017, the disclosure of which is incorporated herein by reference as part of the application.

TECHNICAL FIELD

Embodiments of the present disclosure relates to a flexible printed circuit board, mobile terminal and a method for detecting fault in the mobile terminal.

BACKGROUND

In the conventional mobile terminal, due to the limitation of the space of the mobile terminal, an antenna (e.g., a radio antenna) cannot be integrated into the mobile terminal. Thus, when the mobile terminal is used, an external wiring (e.g., a headphone wiring) must be set and acts as the antenna or the network must be used and mobile data traffic can be generated.

SUMMARY

Embodiments of the present disclosure relates to a flexible printed circuit board, mobile terminal and a method for detecting fault in the mobile terminal.

According to first aspect of the present disclosure, it is provided a flexible printed circuit board (FPC), comprising a first surface and a second surface which are disposed opposite to each other, wherein a backlight source is disposed on the first surface, and an antenna is disposed on the second surface.

According to second aspect of the present disclosure, it is provided a mobile terminal, comprising a display module, wherein the display module comprises: a first FPC and a second FPC connected with the first FPC; and the mobile terminal further comprises: a Bluetooth antenna disposed on one of the first FPC and the second FPC; and a Bluetooth IC disposed on the second FPC.

According to third aspect of the present disclosure, it is provided a method for detecting a fault in the mobile terminal according to claim 5, comprising: receiving register information of the driver IC sent by the mobile terminal after a detection device and the mobile terminal create Bluetooth connection; matching the register information with default standard information; and display detection success if the match is successful, or display detection fault if the match is failure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
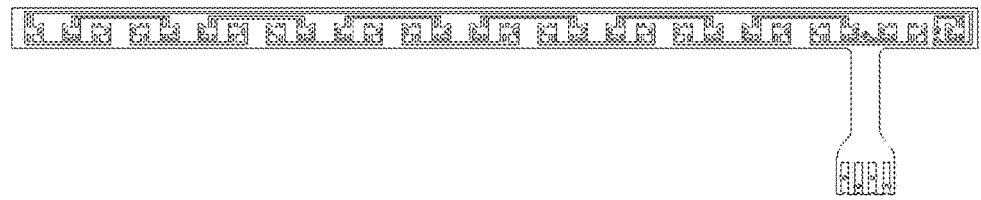
FIG. 1 schematically illustrates the wiring arrangement on the front side of an FPC provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the conventional mobile terminal, a Bluetooth chip (or Bluetooth integrated circuit (IC)) is usually disposed on a mainboard of the mobile terminal, and an antenna structure is individually designed. Since the Bluetooth IC and the antenna structure are independently arranged, the integration of this design is decentralized, and the antenna structure will take up valuable space, which is unfavorable for the miniaturized design of products. Moreover, when a register of a driver IC of the display module with the above convention mobile terminal is being detected, MIPI signals are supplied to a designated device via signal lines, which may requires a number of signal lines. The MIPI signal also has high requirement on the transmission signal line. In the case of unstable signal transmission, the register detection cannot be performed.

An embodiment of the present disclosure provides a flexible printed circuit (FPC), which comprises: a first surface and a second surface which are disposed opposite to each other, herein, a backlight source is disposed on the first surface, and an antenna is disposed on the second surface.

Because the antenna is integrated on the FPC, the above embodiment has compact structure, saves the space, facilitates the thinning tendency of devices employing the FPC, has practical and feasible antenna function, not only does not require the independent arrangement of the antenna structure but also can effectively avoids the inconvenience of an external antenna, reduces the cost, and improves the user experience. Compared with the case that the antenna structure is additionally arranged or the antenna structure is disposed on the mainboard, the embodiment of the present disclosure integrates the antenna on the FPC can sufficiently utilize the idle space of the FPC, will not additionally arrange components or occupy the space, can effectively reduce structural elements and reduce the volume of the mainboard, and facilitates the miniaturization and the lightweight and thinning tendency of the devices employing the FPC.

According to the embodiment of the present disclosure, the specific material and structure of the FPC are not specifically limited and may be selected as required by those skilled in the art, for instance, any FPC known in the field may be adopted in the embodiment.

According to the embodiment of the present disclosure, the FPC may be applied in a display module, and may be in direct electrical connection with the backlight source (such as an LED lamp strip). For instance, the FPC may be an FPC for an LED lamp strip (referred to as LED FPC). The LED FPC comprises a first surface and a second surface which are disposed opposite to each other, wherein an antenna is disposed on one of the first surface and the second surface, and an LED lamp strip is disposed on the other one of the first surface and the second surface. In general, the surface of the LED FPC provided with the antenna is placed upwards (namely in the direction facing users) in the assembly state, and all the materials formed on the LED FPC are unshielded materials. Therefore, there is no electromagnetic shielding in a space where electromagnetic waves are collected, thus, the electromagnetic waves may be collected effectively.

According to the embodiment of the present disclosure, the specific material, specification, structural parameters and the like of the adopted LED lamp strip are not specifically limited and may be selected as required by those skilled in the art, for instance, may include any known LED lamp strip in the field.

According to the embodiment of the present disclosure, the antenna on the FPC may effectively receive or transmit the electromagnetic waves, for instance, may comprise a radio antenna, or a Bluetooth antenna, etc.

According to the embodiment of the present disclosure, the specific shape of the antenna is not specifically limited and may be selected as required by those skilled in the art, as long as it is favorable for the reception and transmission of the electromagnetic waves. In some embodiments of the present disclosure, an LED lamp strip is disposed on the front side of an LED FPC S201, and an antenna structure S202 is disposed on the rear side of the LED FPC S201. For example, the wiring arrangement on the front side of an FPC may refer to FIG. 1. For example, the antenna structure on the back side of an FPC may refer to FIGS. 2-6.

Figure 2:
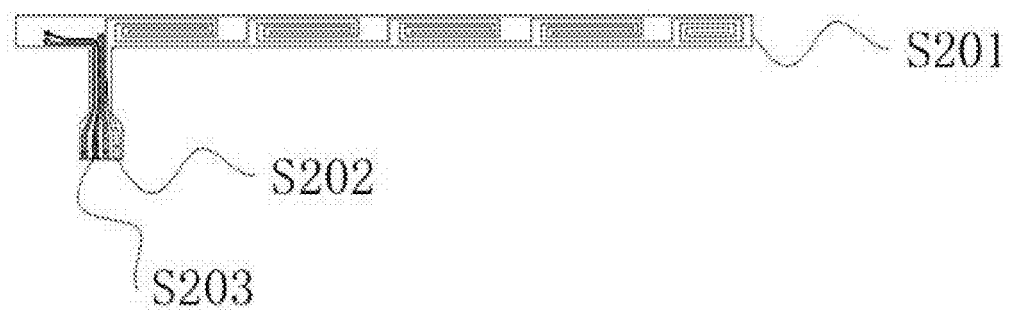
FIG. 2 schematically illustrates the shape of an antenna provided by an embodiment of the present disclosure.
Figure 3:
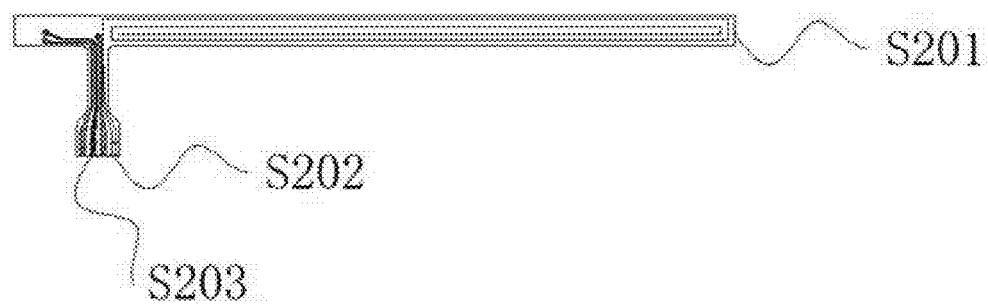
FIG. 3 schematically illustrates the shape of an antenna in another embodiment of the present disclosure.

In some embodiments of the present disclosure, as illustrated in FIG. 2, the shape of the antenna S202 may be designed to be a plurality of unidirectional hollow-square winding structures. The term "unidirectional" here indicates that openings of the plurality of winding structures face the same direction. The antenna S202 starts from the center of the hollow-square on the rightmost side, is extended towards the left side after a first winding structure is formed, subsequently forms second, third, fourth and fifth winding structures, and ends at a protrusion S201 of a bonding pad S203. This design can enhance the function of collecting an alternating electromagnetic field, and can increase the radiating area due to the longer antenna length. Moreover, due to the unidirectional hollow-square design, the unidirectional enhancement of the collected inductive current will not offset, which is beneficial to the improvement of signal gain. The improvement of the signal quality greatly reduces the subsequent requirement on a signal processing circuit, so the cost can be further reduced and the product competitiveness can be increased.

In some other embodiments of the present disclosure, the shape of the antenna S202 may also be designed to be a race track. That is to say, the antenna S202 starts from the center of the winding structure and ends at the protrusion S201 of the bonding pad S203. In this design, the antenna has a longer length in the transverse direction, which is favorable for the collection of frequency-modulated electromagnetic waves.

Figure 4:
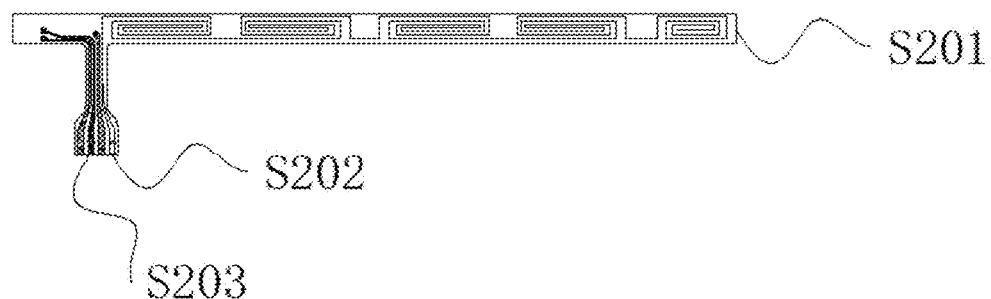
FIG. 4 schematically illustrates the shape of an antenna provided by still another embodiment of the present disclosure.
Figure 5:
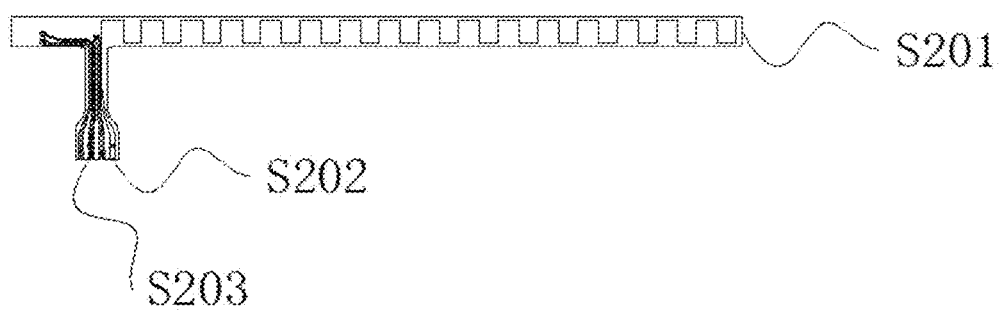
FIG. 5 schematically illustrates the shape of an antenna provided by yet another embodiment of the present disclosure.
Figure 6:
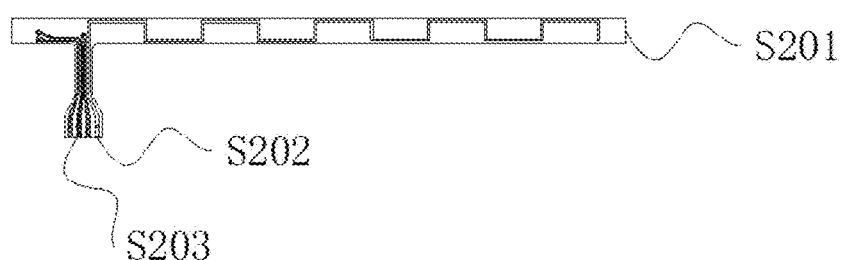
FIG. 6 schematically illustrates the shape of an antenna provided by another embodiment of the present disclosure.

In some other embodiments of the present disclosure, the shape of the antenna S202 may also be designed to be reverse hollow square (as illustrated in FIG. 4) and wavy line S202 (as illustrated in FIGS. 5 and 6). Both the above shapes may increase the length of the antenna, which is favorable for the collection of the electromagnetic waves. The term "reverse" here indicates that openings of two adjacent winding structures have opposite directions. The shape of the antenna as illustrated in FIGS. 5 and 6 may also be referred to as pulse form, and the width of both is different.

According to the embodiment of the present disclosure, the specific method of forming the antenna structure is also not specifically limited and may be selected as required by those skilled in the art, as long as the antenna facilitating the reception and transmission of the electromagnetic waves can be effectively formed. In some embodiments of the present disclosure, the method of forming the antenna may include photolithography, namely, the antenna wiring having different shapes and satisfying the use requirements may be formed on one surface of the FPC by using the photolithography process. Thus, the operation is simple and convenient and easy to realize.

According to the embodiment of the present disclosure, the means of connecting the antenna structure with other elements is also not specifically limited and may be selected as required by those skilled in the art, as long as the antenna structure can be effectively and electrically connected with other elements. In some embodiments of the present disclosure, the antenna may be electrically connected with other elements through the bonding pad.

Figure 7:
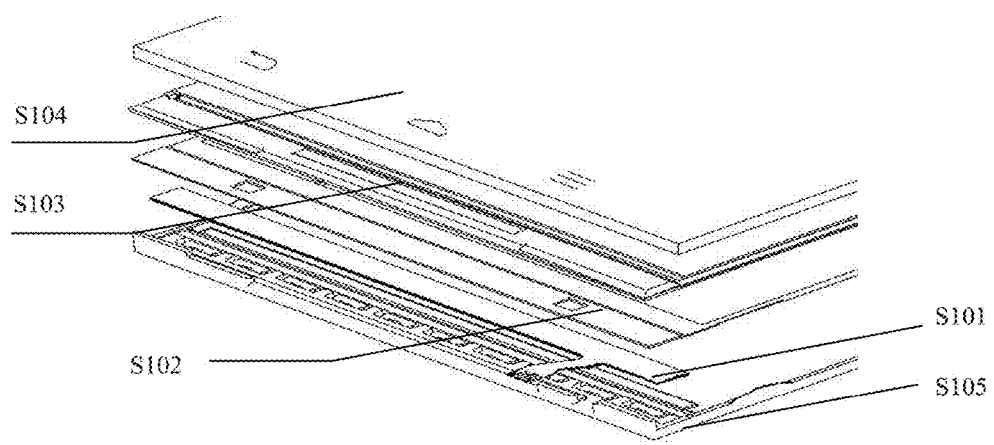
FIG. 7 schematically illustrates a display module provided by an embodiment of the present disclosure.

According to the embodiment of the present disclosure, the above LED FPC may be applied in the display module, in this situation, the antenna will be not shielded, so as to ensure the effective collection of the electromagnetic waves by the antenna. In some embodiments of the present disclosure, as illustrated in FIG. 7, the display module comprises a protective cover S104, an FOG (Film on Glass, namely a display module before the assembly of the backlight module) layer S103, an adhesive tape S102, an LED FPC S101 and a frame S105. LED particles are disposed on the front side of the LED FPC S101. The LED FPC faces a surface of the frame S105 in the assembly state. The wiring in different shape serving as the antenna is disposed on the back side of the LED FPC S101. As can be seen from FIG. 7, the non-grounded adhesive tape S102, the FOG layer S103 and the protective cover S104 are disposed above the LED FPC S101. The back of the LED FPC S101 is placed upwards in the assembly state. As S102, S103 and S104 are all made of unshielded materials and will not shield the antenna, the effective collection of the electromagnetic waves by the antenna can be guaranteed.

The embodiment of the present disclosure further provides a mobile terminal, which comprises a display module. The display module comprises a first FPC and a second FPC connected with the first FPC. The mobile terminal further comprises: a Bluetooth antenna disposed on one of the first FPC and the second FPC; and a Bluetooth IC disposed on the second FPC.

In the above embodiment, because the Bluetooth antenna is integrated on the first or second FPC of the display module, the mobile terminal does not require an external antenna in the use, therefore, the mobile terminal has high integration and compact structure, and facilitates the light-weight and thinning development tendency. In addition, as the Bluetooth IC is disposed on the second FPC of the display module, compared with the design in conventional mobile terminal where the Bluetooth IC is disposed on the mainboard, the embodiment can save the mainboard space, meanwhile fully utilizes the idle space of the FPC, and also facilitates the miniaturization and the light-weight and thinning tendency of the mobile terminal.

According to the embodiment of the present disclosure, the first FPC comprises a backlight FPC, e.g., the LED FPC in the above embodiment. The second FPC comprises a main FPC.

Figure 13:
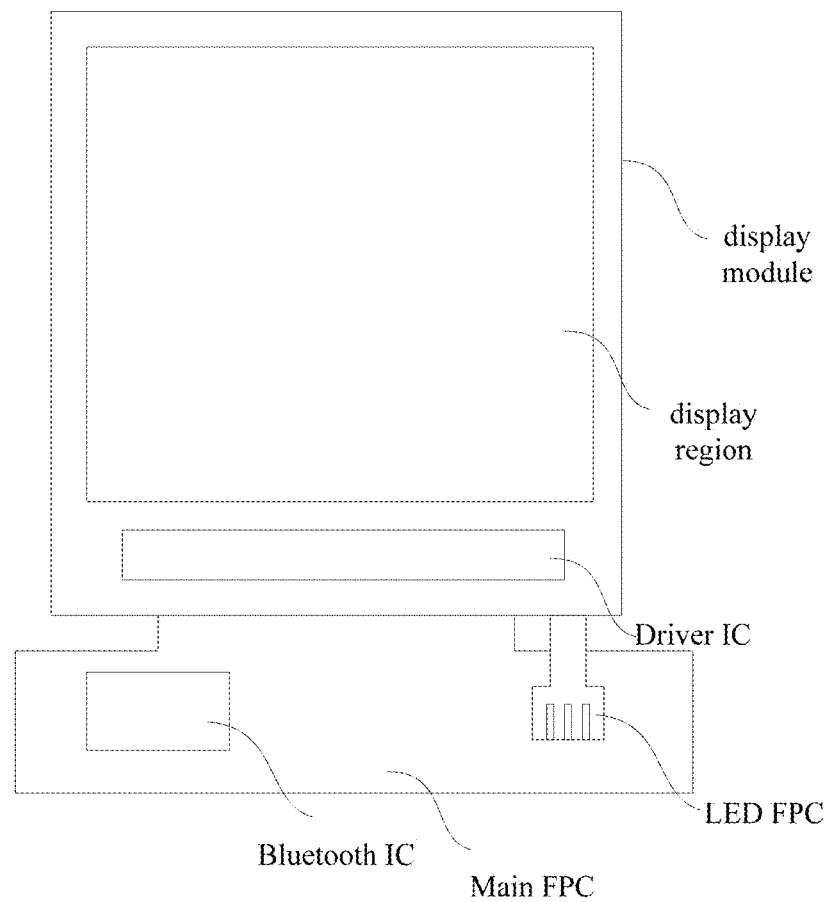
FIG. 13 schematically illustrates a mobile terminal provided by an embodiment of the present disclosure.

In some embodiments of the present disclosure, as illustrated in FIG. 13, the mobile terminal comprises a display module; the display module comprises an FPC for an LED lamp strip (an LED FPC) and a main FPC; and the two FPCs are connected with each other.

According to the embodiment of the present disclosure, the LED FPC comprises a first surface and a second surface which are disposed opposite to each other; LED particles are disposed on the first surface; and the Bluetooth antenna is disposed on the second surface. In the embodiment, the Bluetooth antenna is not disposed on the second FPC, namely no Bluetooth antenna is disposed on the main FPC. In this situation, because the Bluetooth antenna is integrated on the LED FPC, the idle space of the FPC is fully utilized, so that the miniaturization and the light-weight and thinning tendency of the mobile terminal can be realized.

In some embodiments of the present disclosure, as illustrated in FIGS. 2-6, the Bluetooth antenna S202 may be integrated on the LED FPC. As illustrated in FIGS. 2 to 6, when the Bluetooth antenna S202 is integrated on the FPC of the LED lamp strip, the original partial LED bonding pad S203 may be removed from a port of the LED, and subsequently, pins of the antenna S202 are added; and the antenna S202 is connected with other elements through the pins.

According to the embodiment of the present disclosure, the mobile terminal further comprises a mainboard, wherein the second FPC comprises a main FPC communicated with the mainboard; and both the Bluetooth antenna and the Bluetooth IC are disposed on the main FPC. In the embodiment, the Bluetooth antenna is not disposed on the first FPC. In this situation, because the Bluetooth antenna is integrated on the main FPC, the idle space of the FPC is fully utilized, so that the miniaturization and the light-weight and thinning tendency of the mobile terminal can be realized.

Figure 8:
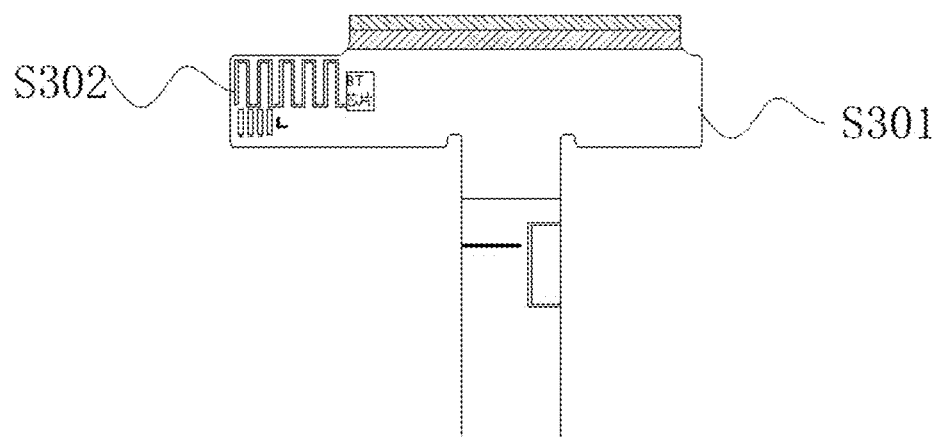
FIG. 8 is schematically illustrates a Bluetooth antenna provided by an embodiment of the present disclosure.

In some embodiments of the present disclosure, as illustrated in FIG. 8, a Bluetooth antenna S302 and a Bluetooth IC may be disposed on a main FPC S301.

Figure 9:
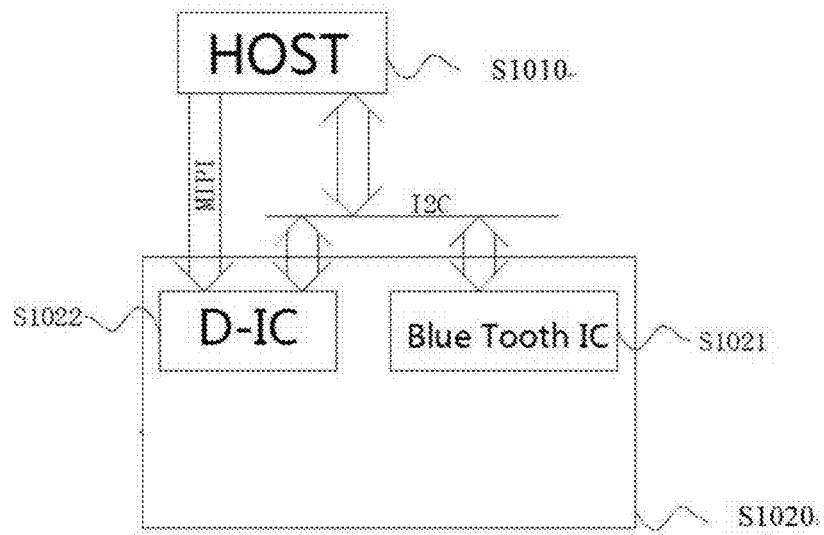
FIG. 9 schematically illustrates a second FPC provided by an embodiment of the present disclosure.

In some other embodiments of the present disclosure, as illustrated in FIG. 9, a display module S1020 further comprises a driver IC (D-IC) S1022 which is configured to drive a display panel; the D-IC S1022 and a Bluetooth IC S1021 are connected with a main board (i.e. HOST terminal) S1010 through the same communication bus.

According to the embodiment of the present disclosure, the D-IC and the main board are communicated with each other through an MIPI interface and an I2C interface. The MIPI interface is configured to transmit image information; and the I2C interface is configured to transmit touch information. Since the D-IC S1022 and the Bluetooth IC S1021 are connected with the main board S1010 through the same I2C interface (or referred to as I2C bus), the D-IC S1022 and the Bluetooth IC S1021 may operate simultaneously and do not affect each other, so the normal use of two functions can be effectively guaranteed.

According to the embodiment of the present disclosure, as illustrated in FIG. 9, the specific operation mode of the mobile terminal is that: Bluetooth IC having an I2C interface is designed on the FPC; the I2C interface of the Bluetooth IC is connected with an I2C bus which is configured to transmit signals between the D-IC and the main board; and when the main board is communicated with the D-IC through the I2C bus, the Bluetooth IC is taken as a SLAVE and not selected, namely not affecting the function of the display module. When the Bluetooth IC operates, the Bluetooth IC can communicate with both the main board and the D-IC through the communication bus and can also communicate with an external Bluetooth device.

According to the embodiment of the present disclosure, the display module is divided into a display region and a non-display region, and both the first FPC and the second FPC are disposed in the non-display region. That is to say, the LED FPC and the main FPC are disposed in the non-display region. For instance, the antenna on the first FPC is away from a shell of the mobile terminal. Thus, the antenna structure will not affect the normal display of the display module and will not be encircled by the shell of the mobile terminal, so the antenna structure will not be shielded and affect the ability of receiving or transmitting the electromagnetic waves. Therefore, the ability of the antenna in receiving or transmitting signals is strong; the gain of the subsequent amplifying circuit is not required to be great; the noise filtering condition will also be moderate; and the function optimization and the cost optimization of products can be realized. For instance, the first FPC and the second FPC are electrically connected with each other through the bonding pad or the pins.

According to the embodiment of the present disclosure, the Bluetooth IC and the Bluetooth antenna are electrically connected with each other. Thus, the mobile terminal can realize wireless communication, is convenient in use, is favorable for improving the user experience, can perform signal transmission and reception, fault detection and the like by wireless means, does not require a complex connecting circuit, and is simple and convenient to operate.

Figure 10:
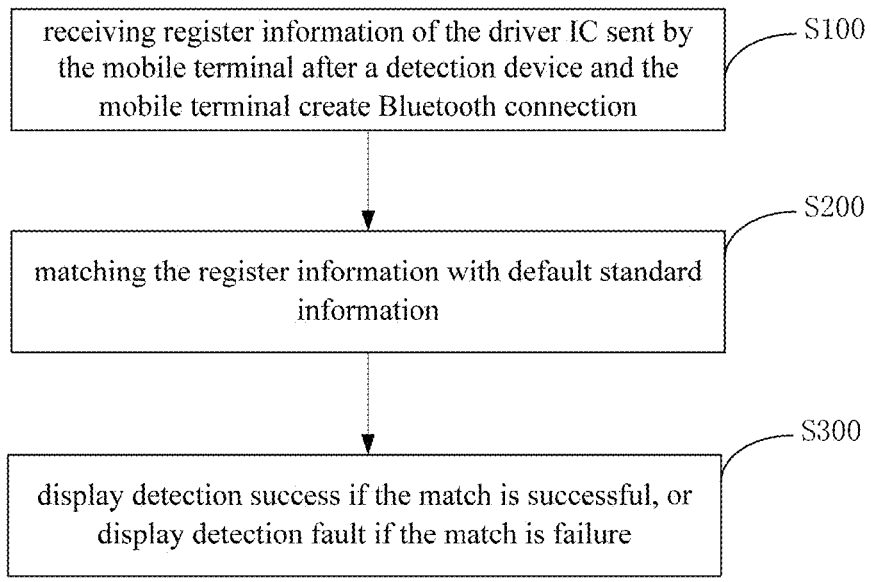
FIG. 10 is a flow chart of a fault detection method of a mobile terminal, provided by an embodiment of the present disclosure.

The embodiment of the present disclosure provides a method for detecting a fault in the mobile terminal. As illustrated in FIG. 10, the method comprises the following steps:

S100: receiving register information of the driver IC sent by the mobile terminal after a detection device and the mobile terminal create Bluetooth connection.

According to the embodiment of the present disclosure, before the detection device and the mobile terminal create Bluetooth connection, the driver IC may be subjected to power-on reset in advance. Thus, the detection result is more accurate and the accuracy is high.

According to the embodiment of the present disclosure, the step may comprise the following steps: firstly, the detection device starts normally, and a Bluetooth IC on the detection device and Bluetooth IC in the mobile terminal are matched; secondly, the detection device sends diagnosis start information; and thirdly, the detection device receives serial-in register information of the Bluetooth IC one by one after receiving success information sent by the mobile terminal, and the detection device sends the diagnosis start information again if not receiving the success information sent by the mobile terminal, and the detection starts until the mobile terminal sends the success information.

S200: matching the register information with default standard information;

S300: display detection success if the match is successful, or display detection fault if the match is failure.

According to the embodiment of the present disclosure, the standard information is prestored in the detection device; after receiving the register information of the driver IC sent by the mobile terminal, the detection device will match the received register information with the standard information, so as to determine whether the register information of the driver IC is biased. If match is successful, namely the received register information is consistent with the standard information, it shows that the detection is successful, for instance, OK may be displayed, which indicates that the driver IC has no fault. If match fails, namely the received register information is not consistent with the standard information, it shows that the detection is failure, for instance, error mark and detailed information may be displayed.

Figure 11:
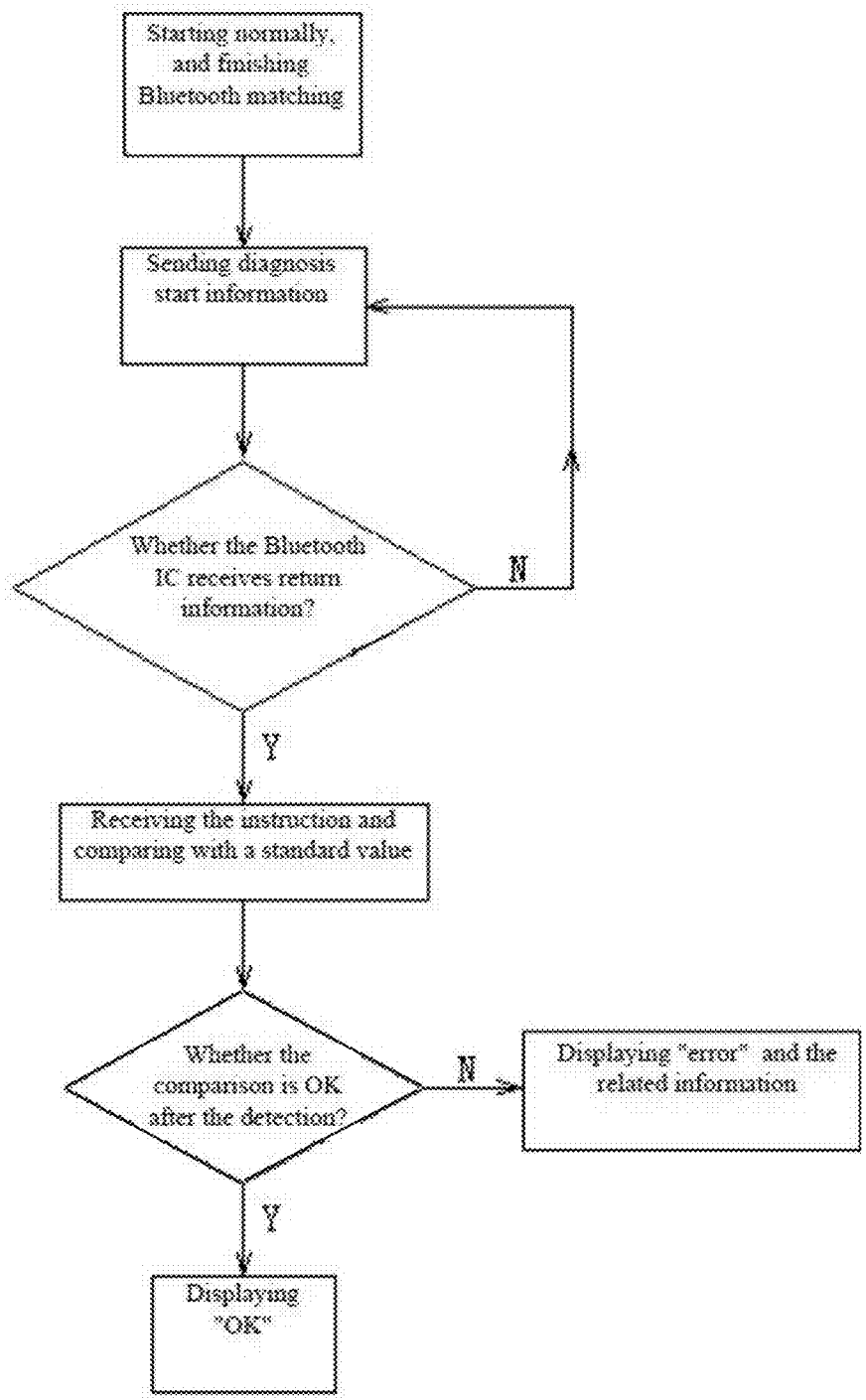
FIG. 11 is a flow chart of operating a detection device in the fault detection method of the mobile terminal provided by an embodiment of the present disclosure.

According to the embodiment of the present disclosure, the specific operation mode of the detection device in the method is as follows: as illustrated in FIG. 11, firstly, the detection device starts normally, and the Bluetooth IC on the detection device and the Bluetooth IC of the mobile terminal are matched; secondly, the detection device sends diagnosis start information; thirdly, the detection device receives serial-in register information of the Bluetooth IC one by one after receiving success information sent by the mobile terminal; and fourthly, the comparison with a default register value (namely the standard information) is completed on a host of the detection device, and after comparison, "Error" and detailed information are displayed if there is difference, or "OK" is displayed if there is no difference.

Figure 12:
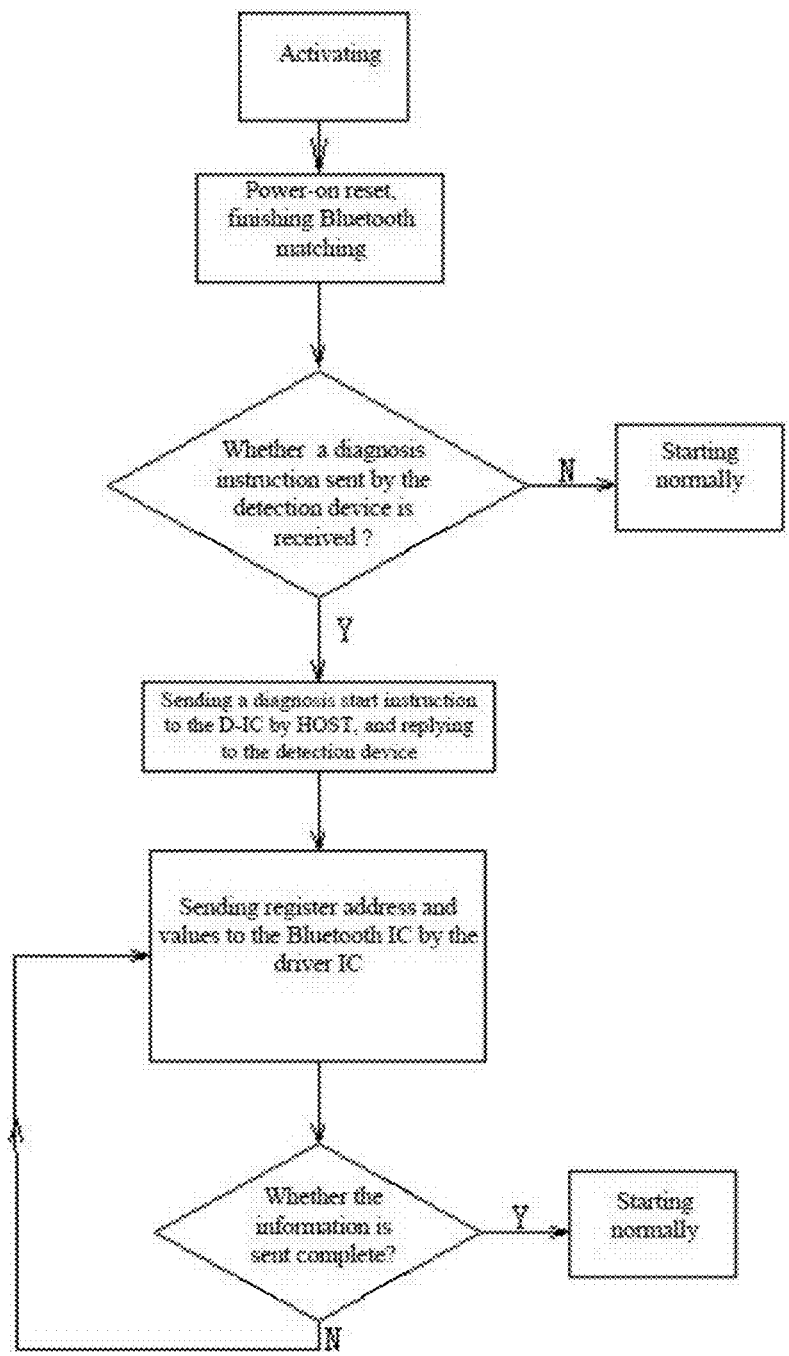
FIG. 12 is a flow chart of operating the mobile terminal in the fault detection method of the mobile terminal provided by an embodiment of the present disclosure.

According to the embodiment of the present disclosure, the specific operation mode of the mobile terminal in the method is as follows: as illustrated in FIG. 12, a product is subjected to power-on reset at first and is successfully matched with the Bluetooth IC of the detection device; in this situation, the product waits for a diagnosis start instruction sent by the detection device; after successful reception, a specific instruction is sent to the driver IC through the I2C bus; subsequently, return information is sent through the Bluetooth IC; after the driver IC receives an inspection start instruction, information including register address and register data is sent to the Bluetooth IC through the I2C bus one by one; and the Bluetooth IC is responsible for sending the above information to an external detection device through the Bluetooth for subsequent determination.

The method of the above embodiment is simple to operate and easy to realize, is favorable for inspecting problems caused by the recording of the register in the IC, facilitates the fault detection of the mobile terminal, improves the efficiency in analyzing the problems, and improves the reliability of the products.

In the disclosure, the following should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. A mobile terminal, comprising:
a display module, comprising a first flexible printed circuit board (FPC) and a second FPC connected with the first FPC;
a Bluetooth antenna, disposed on one of the first FPC and the second FPC; and
a Bluetooth integrated circuit (IC), disposed on the second FPC.

2. The mobile terminal according to claim 1, wherein the first FPC comprises a backlight FPC, the backlight FPC comprises a first surface and a second surface which are disposed opposite to each other; a backlight source is disposed on the first surface; and the Bluetooth antenna is disposed on the second surface.

3. The mobile terminal according to claim 1, further comprising a mainboard, wherein the second FPC comprises a main FPC communicated with the mainboard; and both the Bluetooth antenna and the Bluetooth IC are disposed on the main FPC.

4. The mobile terminal according to claim 3, wherein the display module further comprises a driver IC; and the driver IC and the Bluetooth IC are communicated with the mainboard through the same communication bus.

5. The mobile terminal according to claim 4, wherein the communication bus is an I2C bus.

6. The mobile terminal according to claim 4, wherein the display module is divided into a display region and a non-display region; and the first FPC and the second FPC are disposed in the non-display region and electrically connected with each other.

7. The mobile terminal according to claim 1, wherein the Bluetooth IC is electrically connected with the Bluetooth antenna.

8. The mobile terminal according to claim 1, wherein the Bluetooth antenna is in a shape of race track.

9. The mobile terminal according to claim 1, wherein the Bluetooth antenna is in a shape of hollow square.

10. The mobile terminal according to claim 1, wherein the Bluetooth antenna is in a shape of wavy line.

11. A method for detecting a fault in the mobile terminal according to claim 1, comprising:
- receiving register information of a driver IC sent by the mobile terminal after a detection device and the mobile terminal create Bluetooth connection;
- matching the register information with default standard information; and
- display detection success if the match is successful, or display detection fault if the match is failure.

* * * * *